United States Patent
Gardner et al.

(10) Patent No.: US 6,546,652 B1
(45) Date of Patent: Apr. 15, 2003

(54) ANIMAL TAG

(75) Inventors: Michael Stuart Gardner, 108 Waiatarua Road, Remuera, Auckland (NZ); Roy Victor Bladen, Auckland (NZ)

(73) Assignee: Michael Stuart Gardner, Auckland (NZ)

( * ) Notice: Subject to any disclaimer, the term of this patent is extended or adjusted under 35 U.S.C. 154(b) by 0 days.

(21) Appl. No.: 09/913,676

(22) PCT Filed: Feb. 18, 2000

(86) PCT No.: PCT/NZ00/00014

§ 371 (c)(1),
(2), (4) Date: Oct. 26, 2001

(87) PCT Pub. No.: WO00/48457

PCT Pub. Date: Aug. 24, 2000

(30) Foreign Application Priority Data

Feb. 18, 1999 (NZ) ................................. 334304
Apr. 20, 1999 (NZ) ................................. 335334

(51) Int. Cl.⁷ ............................................ A01K 11/00
(52) U.S. Cl. ........................... 40/302; 40/301; 119/655
(58) Field of Search ............................. 119/858, 860, 119/655; 40/301, 302; 24/16 PB, 30.5 P

(56) References Cited

U.S. PATENT DOCUMENTS

| | | | |
|---|---|---|---|
| 1,822,390 A | * 9/1931 | Brooks ...................... 40/302 |
| 3,942,480 A | 3/1976 | Hair et al. | |
| 4,198,772 A | * 4/1980 | Furutu ........................ 292/318 |
| 4,209,924 A | 7/1980 | Fearing | |
| 4,441,233 A | * 4/1984 | Swift ......................... 24/16 PB |
| 4,581,834 A | * 4/1986 | Zatkos et al. .............. 119/655 |
| 4,635,389 A | 1/1987 | Oudelette | |
| 4,694,781 A | * 9/1987 | Howe et al. ................ 119/655 |
| 4,953,313 A | * 9/1990 | Scott .......................... 40/301 |
| 6,405,462 B1 | * 6/2002 | Gardner et al. ............. 40/301 |

FOREIGN PATENT DOCUMENTS

| | | | |
|---|---|---|---|
| EP | 336848 A1 | * 10/1989 |
| EP | 0890305 | 1/1999 |
| GB | 2037236 | 7/1980 |
| NZ | 231510 | 9/1994 |
| WO | WO 91/10982 A1 | * 7/1991 |
| WO | WO 95/04455 A1 | * 2/1995 |

* cited by examiner

*Primary Examiner*—Charles T. Jordan
*Assistant Examiner*—John W. Zerr
(74) *Attorney, Agent, or Firm*—Ladas & Parry

(57) ABSTRACT

A tag for application to the ear of an animal includes a male portion and female portion. The female portion includes a chamber within which an insert is accommodated, the insert engaging in an interlocking manner with the chamber and allowing access of a head of the male portion into the chamber but then acting to prevent removal of the head. The male and female portions may be connected at a central portion which enables folding of the male and female portions. In another embodiment, the central portion may include a weak-link so that the male and female portions can be torn apart if the tag becomes caught on an obstruction.

11 Claims, 3 Drawing Sheets

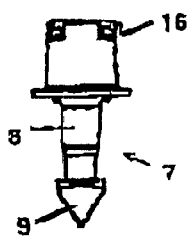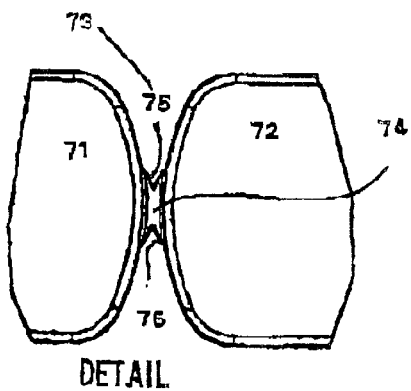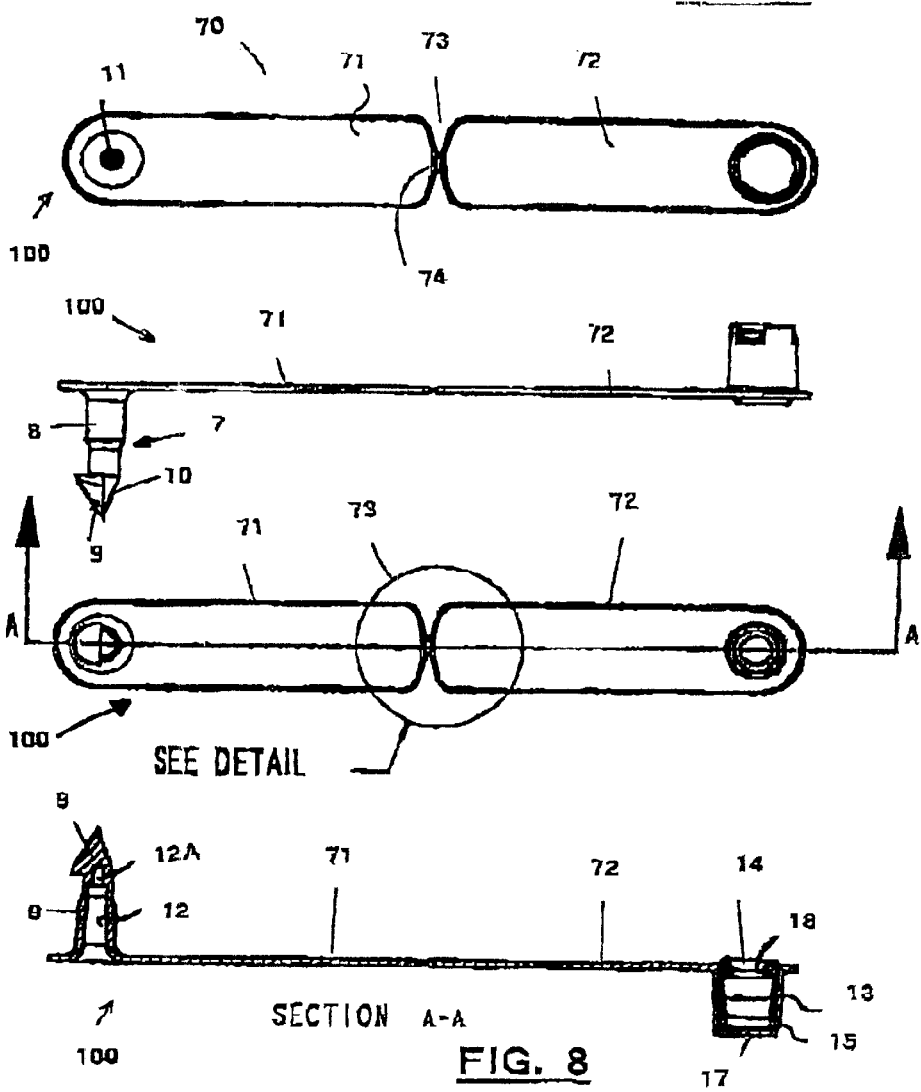

ANIMAL TAG

TECHNICAL FIELD

The present invention relates to improvements in and relating to a tag and more particularly to an ear tag for use in the identification of animals.

BACKGROUND OF THE INVENTION

To the present time, various proposals have been put forward for the design of animal ear tags including many which are the subject of patents held by the present applicant. All of these tags may have features giving particular benefits and have particular uses. These tags may also be designed to have specific features depending on whether the ear tag is intended to be one retained on an animal for some period of time as a long term identification means or whether it is merely a temporary identification means such as when an animal is being sent to slaughter.

Many existing tags are formed in two parts, which are engaged together on application to the animal. Therefore, there is a risk that one part of the tag may be lost, rendering the other half useless. Also, when printing is required on both parts of the tag, these parts must be matched prior to application. Furthermore, the manufacturing costs of multiple part tags are typically higher than for single part tags.

Animal tags are often applied to an animal's ear. To apply the tag, the skin and tissue of the ear is typically pierced or broken and a pin or similar elongate member inserted through the resulting hole created in the ear. There is a risk that the ear may become infected due to the resulting wound. Furthermore, the animal may experience significant discomfort during and immediately after application of the tag.

The present invention has been particularly developed in respect of a tag which will be retained by an animal such as a sheep typically for some period of time and will avoid or at least alleviate the above problems and the possibility of the tag being interfered with and being removed from one particular animal and possibly reused on another animal. The present invention in one embodiment also addresses the problems associated with animal tags catching or becoming entangled in fences, vegetation, or other snags. In such circumstances, an animal can be trapped or injured when a tag is caught by an obstruction. Injury usually occurs where the animal tears the tag out of its ear.

OBJECTS OF THE INVENTION

Thus, it is an object of the present invention to provide a tag which overcomes or at least alleviates problems in tags at present or one which will provide the public with a useful choice.

Further objects of this invention may become apparent from the following description.

SUMMARY OF THE INVENTION

According to one aspect of the present invention there is provided a tag for application to the ear of an animal, the tag having a male portion including an upstanding projection adapted to be inserted through an animal's ear and a female portion having engagement means adapted to engage with the projection, the engagement means including a chamber which is substantially closed off at an outer end thereof and a hollow insert accommodated within the chamber and provided as a continuous body of a material which is of substantially the same hardness or is softer than a material forming the chamber, which body can expand as a head of the projection is inserted but can contract about the head after insertion to allow passage therethrough of the head of the projection but resisting withdrawal therefrom and wherein the chamber and insert, in use, are adapted to engage in an interlocking manner.

Preferably, the insert may include at least one protrusion adapted to be received in an aperture in said chamber to form said interlocking manner of engagement.

In one preferred form, the insert may be constructed from the same material as said chamber.

In an alternative form, the insert may be constructed from a softer material than said chamber.

Preferably, the male and female portions may be integrally connected at a central portion of the tag and the tag adapted to be bent about said central portion to engage said male and female portions.

Preferably, the central portion may be substantially narrower than said male and female portions.

Preferably in one embodiment, the central portion may include a frangible link.

Preferably in one embodiment, the frangible link may include a portion of material thinner than its surrounding material adapted to cover upon application of a predetermined force.

Preferably in one embodiment, the thin portion of material may include at least one notch on one or both of its sides so as to aid severance thereof.

Preferably, the head of said projection may include a chamfered or cut-away edge.

Preferably, the head may be substantially conically shaped and said chamfered edge may be formed by an enlarged half-cone at the head of said projection.

Further aspects of this invention, which should be considered in all its novel aspects may become apparent from the following description given by way of example of possible embodiments of the invention and in which reference is made to the accompanying drawings.

BRIEF DESCRIPTION OF THE DRAWINGS

FIG. 6A: illustrates a bottom perspective view of a further embodiment of an animal tag incorporating a weak link;

FIG. 6B: illustrates a top perspective view of a further embodiment of an animal tag incorporating a weak-link;

FIG. 6C: illustrates a top perspective view of a further embodiment of an animal tag incorporating a weak-link and an insert;

FIG. 7: illustrates end, rear, plan, side and plan views of the tag shown in FIG. 6;

FIG. 8: illustrates a side cut-away view along arrows A—A of the tag shown in FIG. 7; and FIG. 9: illustrates a detail of the tag shown in FIGS. 6 to 8.

BRIEF DESCRIPTION OF PREFERRED EMBODIMENTS OF THE INVENTION

Figure 1:
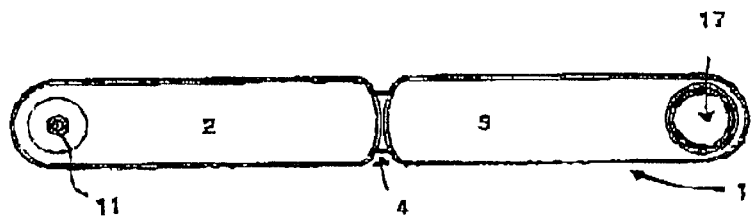
FIG. 1: shows a rear view of a tag according to one possible embodiment of the invention.
Figure 2:
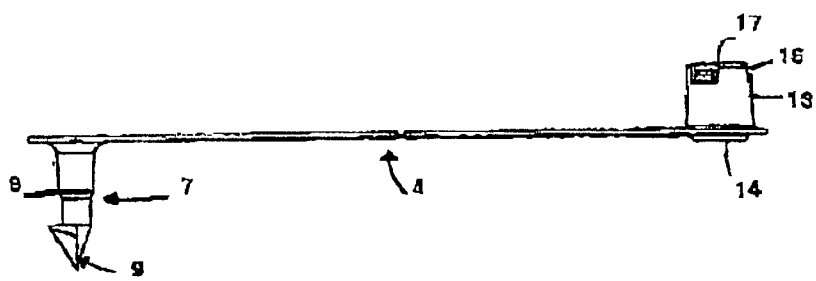
FIG. 2: shows a side view of the tag of FIG. 1.
Figure 3:
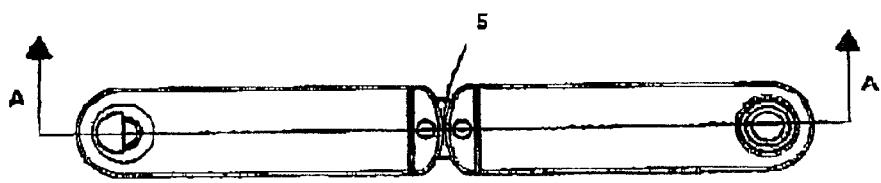
FIG. 3: shows a plan view from the opposite side of the tag of FIG. 1.
Figure 4:
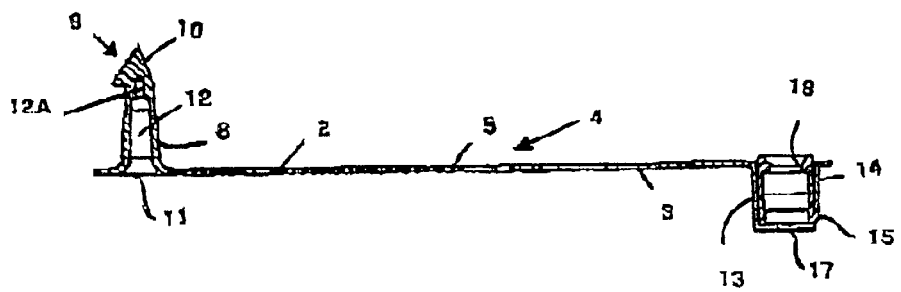
FIG. 4: shows a view along arrows A—A of FIG. 3.
Figure 5:
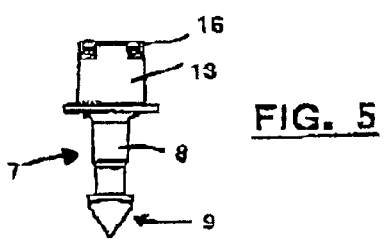
FIG. 5: shows an end view of the tag of the preceding Figures.

Referring first to FIGS. 1 to 4, an animal ear tag according to one possible embodiment of the invention is referenced generally by arrow 1. It is shown comprising a male portion 2 and a female portion 3. The male portion 2 and female portion 3 are joined together about a substantially central portion 4.

In use, the tag 1 is folded over itself about the central portion 4, allowing the male portion 2 and female portion 3 to engage and aligning the male and female portions 2, 3 to facilitate engagement. A suitable applicator with a pin may be used as is widely known in the art. A particular advantage of the tag 1 is that two separate components do not need to be applied to the applicator, which allows easier handling, reduced risk of losing part of the tag and resulting in faster application.

It will be appreciated that the male and female portions 2, 3 of the present invention may be formed separately. Alternatively, in the embodiment as shown in the accompanying figures the male and female portions 2, 3 may be separated about the central portion 4 if this is more appropriate in a particular use of the tag. However, the advantages of reduced manufacturing costs associated with a single piece tag, and reduced risk of losing a part of the tag 1 may be lost.

The central portion 4 may preferably as shown include a neck 5 defined by a narrowing of the cross section of the strip of material forming the male and female portions 2, 3. The provision of a neck 5 may assist in the folding over the tag 1 and the alignment of the male and female portions to facilitate engagement.

Figure 6:
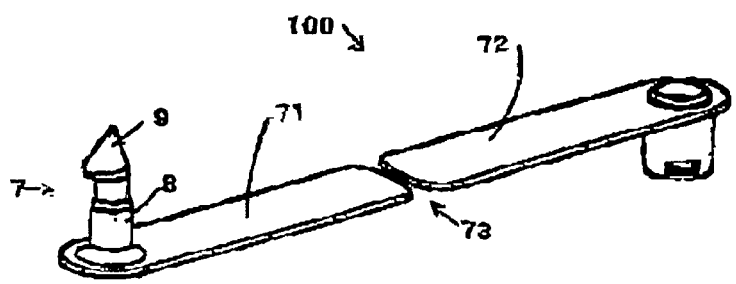
FIG. 6: illustrates three perspective views of a further embodiment of an animal tag incorporating a weak-link.
Figure 6:
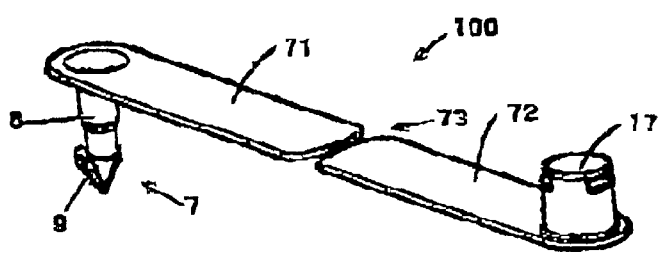
Figure 6:
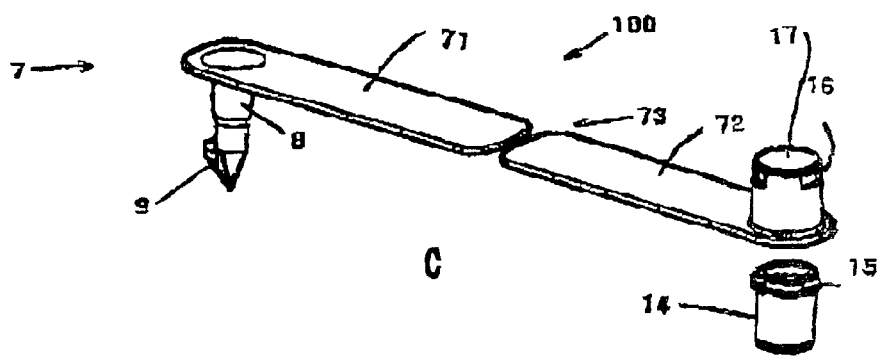

In an alternative embodiment, the neck is constructed in the form shown in tag 100 in FIGS. 6 to 9. The neck 73, in this case, is located between female portion 72 and male portion 71 and is formed from a frangible piece of material, or weak-link 74 shown in detail in FIG. 9. It will be appreciated that male and female portions 71, 72 of tag 100 may be substantially equivalent to male and female portions 2, 3 of tag 1.

In application and use, the tag 100 is folded as described elsewhere in the specification. Preferably, the weak-link 74 is sufficiently robust so as to not sever during application of the tag 100. However, the construction (i.e. thickness, shape and/or composition, etc.) of the weak-link 74 is such that it will break, tear, or otherwise rupture when the tag is subjected to a predetermined force.

This force may be calculated on the basis of the tissue strength of the attachment location for the tag 100. For example, in the case of an animal's ear, the weak-link 74 would be adapted so that if the animal caught the tag 100 in an obstruction such as a fence of branch, the weak-link 74 would break before the animal experienced significant tissue damage. Of course, the primary objective is to avoid the tag 100 being pulled completely out of the animal's ear due to it catching on an obstacle.

FIGS. 6A and 6B illustrate two perspective views of the animal tag 100. FIG. 6C shows a perspective view of the tag 100 and insert 14, which, as described herein is used to assist in securely engaging the male and female portions 71 and 72. FIG. 8 shows a cut-away view of the tag 100, illustrating how the insert 14 is located within the chamber 13.

Referring now to FIG. 9, this illustrates the detail of the weak-link portion. This may include notches 75 and 76, which are shaped so as to assist in tearing the weak-link 74 when the animal tag is caught on obstruction. It will be appreciated that these notches may be in another form, as may be the cross-sectional shape of the weak link 74.

In the preferred embodiment, the weak-link 74 is in the form of a thin plastic membrane composed of the same plastic as the male and female portions 71 and 72. This construction significantly simplifies the manufacturing of the ear tags 100 as they may be injection moulded or otherwise moulded in a single integral part. A further advantage of this construction is that the whole tag 100, like tag 1, is kept in a single piece so that when priming is applied to the surfaces of the part, there is no need to correlate individual components of the ear tag. Further, as the tag 100 is not constructed in two pieces or applied in two pieces, the risk of dropping or losing individual pieces of the tag is reduced or eliminated. Also, the present construction avoids the situation where a multi component ear tag needs to be mounted in an applicator for fastening to the animal's ear. The present construction does not require the ear tag 100 to be broken apart for application or putting into an applicator when being placed in the animal's ear. It will be appreciated that ear tag 1 has equivalent advantages due to neck portion 5 connecting the male portion 2 and female portion 3.

The male portions 2 and 71 are shown including a spike 7 having a stem or projection 8 and a head or tip 9. Preferably, as shown, the tip 9 may have a cut away or chamfered edge 10 which has been found to improve the cutting edge of the tip 9. The chamfered edge 10 may be formed by an enlarged half-cone at the tip 9. The resulting improved cut in the animal's ear can speed healing of the ear and therefore reduce the risk of infection.

The stem 8 is seen to be hollow having a bottom aperture 11 to enable the entry of the pin of an applicator as the spike 7 is driven through the animal's ear and into the female portion 3 or 72. As is well known the provision of the hollow stem 8 surrounding the applicator pin avoids the transference of infection between animals sequentially having the ear tags applied, due to the avoidance of blood on the pin. The bore 12 through the stem 8 is shown in this example extending slightly at 12A into the head or tip 9.

The female portions 3, 72 are shown provided with a chamber 13 which is able to accommodate an insert 14. The insert 14 may suitably have one or more projections, fingers or the like 15 which once the insert 14 is accommodated with the chamber 13 will be able to engage within apertures 16 provided around the upper periphery of the chamber 13 so as to lock the insert 14 in position. Additional or alternative locking means may of course be provided. Most importantly the chamber 13 is shown having a closed off upper face 17 so that with the insert 14 in position it is not possible, or it is made very difficult, for the insert 14 to be pushed out thus preventing or again making it very difficult, for an unauthorised release of a tag 1 or 100 from an animal's ear and the subsequent reuse of the same tag on another animal.

The bottom of the insert 14 is shown with an inwardly directed rim of lip or the like 18 which will engage behind the tip or head 9 to prevent its removal.

The tag 1 may be manufactured by any suitable technique and from any suitable material although a moulding of plastic material such a nylon 6 or polyurethane may be particularly suitable. The insert 14 may suitably be of the same material as the rest of the tag 1 or may be of a softer material. It has been found that the use of a softer material for the insert 14 may improve its characteristics in holding the spike 7 in position by the expansion of the insert 14 as the tip 9 is inserted and the subsequent contraction of the insert 14 about the tip 8. The softer material may for example be another, more pliable, grade nylon 6.

The breaking apart of the male and female portions 71, 72 will, however, enable the spike 7 to rotate within the insert 14 and chamber 13 due to the clearance between the spike 7 and the walls of the insert 14.

It is also pointed out that as the insert 14 is preferably manufactured with a complete, for example substantially cylindrical, body i.e. it does not have any longitudinal split in its construction, so that even if some unauthorised person pushed out the insert 14 from the chamber 13, it would be very difficult for the insert 14 to be removed from the projection 7 without the insert 14 being noticeably damaged and probably not reusable.

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

What is claimed is:

1. A tag for application to an ear of an animal, the tag having a male portion including an upstanding projection adapted to be inserted through an animal's ear and a female portion having engagement means adapted to engage with the projection, the engagement means including a chamber which is of a hard material and substantially closed off at an outer end thereof and a hollow insert accommodated within the chamber and provided as a continuous body of a material which is of substantially the same hardness or is softer than the material forming the chamber, which body can expand as a head of the projection is inserted but can contract about the head after insertion to allow passage therethrough of the head of the projection but resisting withdrawal therefrom and wherein the chamber and insert, in use, are adapted to engage in an interlocking manner, the head of said projection includes a chamfered or cut-away edge, said head being of a substantially conical shape and said chamfered or cut-away edge is formed by an enlarged half-cone at the projection head.

2. A tag as claimed in claim 1, the insert including at least one protrusion adapted to be received in an aperture in said chamber to form said interlocking manner of engagement.

3. A tag as claimed in claim 1, wherein said material of said insert is the same material as said material of said chamber.

4. A tag as claimed in claim 1, wherein said material of said insert is softer than said material of said chamber.

5. A tag as claimed in claim 1, wherein said male and female portions are integrally connected at a central portion of the tag and the tag is adapted to be folded about said central portion to engage said male and female portions.

6. A tag as claimed in claim 5, wherein said central portion is substantially narrower than said male and female portions.

7. A tag as claimed in claim 5, wherein said central portion includes a frangible link.

8. A tag as claimed in claim 7, wherein said frangible link includes a portion of material thinner than material surrounding said thinner material portion and adapted to sever upon application of a predetermined force.

9. A tag as claimed in claim 8, wherein the central portion includes at least one notch on one or both of its sides so as to aid severance of said thin portion of material.

10. A tag for application to an ear of an animal, the tag having a male portion including an upstanding projection adapted to be inserted through an animal's ear and a female portion having engagement means adapted to engage with the projection, the engagement means including a chamber which is of a hard material and substantially closed off at an outer end thereof and a hollow insert accommodated within the chamber and provided as a continuous body of a material which is of substantially the same hardness or is softer than the material forming the chamber, which body can expand as a head of the projection is inserted but can contract about the head after insertion to allow passage therethrough of the head of the projection but resisting withdrawal therefrom and wherein the chamber and insert, in use, are adapted to engage in an interlocking manner, the head of said projection includes at least one chamfered or cut-away edge, said head being of a substantially conical shape and said chamfered or cut-away edge is formed by an enlarged partial cone at the projection head.

11. A tag as claimed in claim 10 wherein said enlarged partial cone is a half-cone.

* * * * *